US006209922B1

(12) United States Patent
Klein

(10) Patent No.: US 6,209,922 B1
(45) Date of Patent: Apr. 3, 2001

(54) COPY PROTECTED SECURITY PRINT

(75) Inventor: Thomas Klein, Wolfenbüttel (DE)

(73) Assignee: Baasel Scheel LaserGraphics GmbH (DE)

(*) Notice: Subject to any disclaimer, the term of this patent is extended or adjusted under 35 U.S.C. 154(b) by 0 days.

(21) Appl. No.: 09/252,964

(22) Filed: Feb. 19, 1999

(51) Int. Cl.[7] .............................. B42D 15/00; G09C 3/00

(52) U.S. Cl. .............................. 283/72; 283/91; 283/902; 380/54

(58) Field of Search ................................ 283/91, 93, 901, 283/902, 72, 67; 380/54, 18; 359/2, 267

(56) References Cited

U.S. PATENT DOCUMENTS

| | | | | |
|---|---|---|---|---|
| 4,175,774 | | 11/1979 | Tonges et al. . | |
| 5,034,982 | * | 7/1991 | Heninger et al. | 380/54 |
| 5,074,596 | * | 12/1991 | Castagnoli | 283/91 |
| 5,142,383 | * | 8/1992 | Mallik | 359/2 |
| 5,340,159 | * | 8/1994 | Mowry, Jr. | 283/93 |
| 5,722,693 | * | 3/1998 | Wicker | 283/67 |
| 5,853,197 | * | 12/1998 | Mowry, Jr. et al. | 283/91 |
| 5,863,075 | * | 1/1999 | Rich et al. | 283/94 |
| 5,912,767 | * | 6/1999 | Lee | 359/567 |

FOREIGN PATENT DOCUMENTS

| | | | |
|---|---|---|---|
| 4431531 | * | 3/1996 | (DE) . |
| 0721849 | * | 7/1996 | (EP) . |

* cited by examiner

*Primary Examiner*—Stephen F. Gerrity
(74) *Attorney, Agent, or Firm*—Jagtiani & Associates

(57) ABSTRACT

A security print contains a background pattern formed for example of dots or lines. An object, for example the text “BEWARE OF FORGERY”, is worked into this regular background pattern for copy protection. The text is worked in by the individual lines of the background pattern being split at the places where the text is located into two partial lines which are each only about half as wide as the original line. With the naked eye this split of the background pattern components is not, or barely, recognizable. When such an original security print is copied on a conventional copying machine the original, relatively wide lines of the background pattern appear on the copy but the partial lines formed by the split thereof are not, or very poorly, copied so that the text “BEWARE OF FORGERY” appears clearly in the copy.

13 Claims, 4 Drawing Sheets

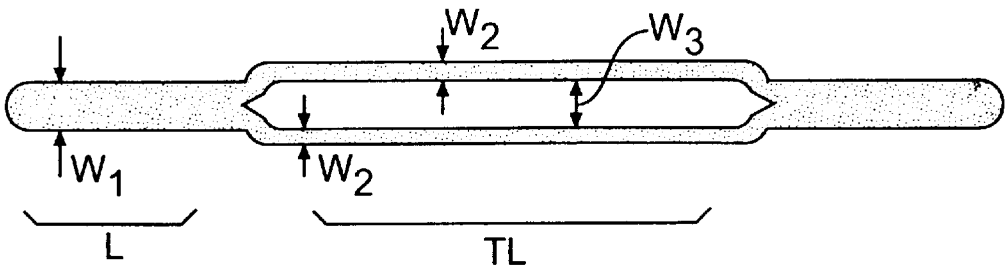
FIG. 3
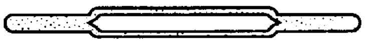
FIG. 4a
FIG. 4b
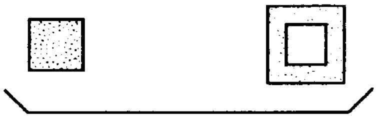
FIG. 4c
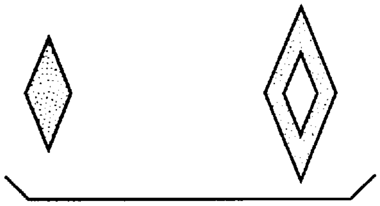
FIG. 4d
FIG. 4e
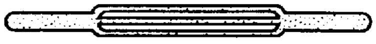

COPY PROTECTED SECURITY PRINT

BACKGROUND OF THE INVENTION

1. Field of the Invention

This invention relates to a copy-protected security print having a substantially regular background pattern of lines, dots, screen structures or the like.

2. Description of the Prior Art

It is well known to print documents to be protected from forgery with fine patterns constituting a background for other printed information. This background consists for example of families of lines, guilloches, dot patterns, screen structures and the like. Information, for example texts, logos or numerals, is then printed on this more or less regular background pattern.

Such a security print can be monochrome or colored. A colored security print is preferable to a black-and-white print because it is more difficult to copy. However, highly developed color copiers exist today which are capable of making remarkably good copies even of colored security prints. There are numerous measures for preventing or complicating the forgery of printed documents.

SUMMARY OF THE INVENTION

The problem of the present invention is to provide a security print, and a method for producing such a security print, which cannot be copied by a commercial photocopier without the copy being immediately recognizable.

This problem is solved according to the invention by a copy-protected security print wherein at least one object, for example letters, numerals or the like, is worked into a substantially regular background pattern of lines, dots, screen structures or the like by the components of the background pattern being split at the places occupied by the object, i.e. a line being split into a plurality of partial lines or a solid circle into a ring.

The background formed for example by a plurality of parallel fine lines is mostly perceived only as "gray" at a superficial glance. The individual lines of the background pattern are recognizable as such only upon closer inspection. The same holds for other background patterns, for example a pattern of dots, rectangles, rhombuses or a combination of such background pattern components.

According to the invention these background pattern components are "split" at the places where the "object" is worked in. The term "object" here means any sign or combination of signs, for example individual letters, texts, numerals, logos and the like.

The term "split" means that a continuous printed area, for example a line, is divided up in such a way that the continuous area becomes at least two partial areas, i.e. a continuous line is replaced by two, three or more partial lines. The total width of a group of two or more partial lines is not essentially greater than the continuous line replaced by the partial lines.

The objects worked into the background pattern according to an aspect of the invention are already practically imperceptible with the naked eye at a feature size, for example line width, of less than 150 microns, preferably less than 100 microns. When such a print is copied with a commercial copying machine one can clearly see the thin lines, dots and the like of the background pattern on the copy, but the copy is deficient at the places where the background pattern components are split, i.e. where the object is. Depending on the quality and mode of operation of the copying machine, the object appears much lighter than the rest of the background pattern and at some places the partial lines, partial dots and the like have not been copied at all. That is to say, at these places the object appears completely white, considering for example a black-and-white security print and its copy. In practice one will naturally work such "objects" into the background pattern so that the viewer immediately detects the copy and does not assume the "object" belongs to the original print. For example it is useful to work the word "Copy" or "Forgery" or the like into the background pattern as an "object". This word will then be immediately recognizable on the copy.

With background patterns consisting of lines, families of lines, groups of lines and the like, or containing such lines, it has proven expedient and sufficient for copy protection to split the individual lines into two partial lines at the places occupied by the object, the width of each partial line preferably corresponding to about half the line width of the original line. If there are two partial lines per line, the width of each partial line is preferably about 40 to 45% of the original line width, and the distance between the paired partial lines is between one third and two thirds of the original line width.

Rather than lines, the background pattern can have dots, that is to say solid circles, alone or in combination with lines, rectangles and other background pattern components. Dots, that is to say solid circles, in the background pattern are split in such a way that the solid circle is replaced by a ring, the area of the ring corresponding to about 50 to 150% of the area of the circle, preferably between 85 and 115%. The thickness of the ring, that is to say the difference between outside radius and inside radius of the ring, corresponds to about half the diameter of the solid circle.

These standard values can also be transferred to other types of background patterns, for example squares. A solid square can be replaced by an angular ring or frame, its line width being selected so that the area of the frame corresponds approximately to that of the solid square. Other possible patterns are rhombuses, ellipses and the like. These patterns can also be combined in almost any desired way.

It has turned out that the exposure of the "object" hardly recognizable with the naked eye by copying the security print depends on the type of copier as well as the orientation of the background pattern with respect to the scanning direction of the security print on the copier. If one experiments with an inventive security print and a commercial copying machine, rotating the security print somewhat on the document glass plate for each copying process, one sees that the "object" does not appear with equal clarity at each copying process.

To optimize the copy protection for the inventive security print, in particular in conjunction with a background pattern in linear form, one preferably varies the orientation of the background pattern continuously or in steps between 0° and 360°. With such a security print some objects or partial areas of an object might appear less clearly and others more clearly. In any case the copy will be immediately recognized as such.

The invention relates furthermore to a method for producing a security print comprising the following steps:

a) supplying print information for the background pattern;

b) supplying positional information for the object to be worked in;

c) supplying modified print information which is capable of replacing the print information for the background pattern in certain places, and replaces the continuous background pattern components by split components; and d) combining the information according to a), b) and c) in such a way that the print information for the background pattern is replaced by the modified print information at the places where the object is located.

With this method one can produce a composition pattern for an inventive security print using a laser engraving machine for example. The composition pattern can also be prepared by producing a film with the help of an image setter and then transferring the film information. The original information about the background pattern for the entire surface of a security print is stored in a memory. In a further memory the print information about the object is stored, for example the word "FORGERY" to be worked in at a certain place or a plurality of places in the security print. The memory contents are then superimposed in such a way that the print information for the background pattern is replaced at the places of the object by modified print information according to which continuous lines are replaced by paired parallel partial lines for example. After the object has thus been worked into the background pattern the composition pattern is prepared.

BRIEF DESCRIPTION OF THE DRAWINGS

In the following some embodiments of the invention will be explained more closely with reference to the drawing, in which:

FIG. 3 shows a greatly enlarged line of a background pattern;

FIGS. 4*a* to 4*e* show various possibilities for splitting components of a background pattern.

DETAILED DESCRIPTION

Definition

For the purposes of the present invention, the term "hollowed region" refers to the portion of the lines, geometrical shapes, etc. of a background pattern that is hollowed or lightened to form part of an object. FIG. 1*a* illustrates how hollowed region may be used to form an object in a background pattern consisting of lines. FIGS. 3 and 4*a* illustrate a hollow region in a portion of a line. FIG. 4*b* illustrates a circular hollow region in a circle, FIG. 4*c* illustrates a square hollow region in a square, FIG. 4*d* illustrates a rhomboid hollow region in a rhombus, and FIG. 4*e* illustrates two adjacent hollow regions in a portion of a single line.

The inventive security pattern can be produced by different printing methods. In the present case it is assumed by way of example that a printing roll or plate is prepared by film exposure, a film being exposed with an image setter and the information of the offset film then transferred. The preparation of the print information for the security print then includes the working of "objects" into the background information.

Figure 1:
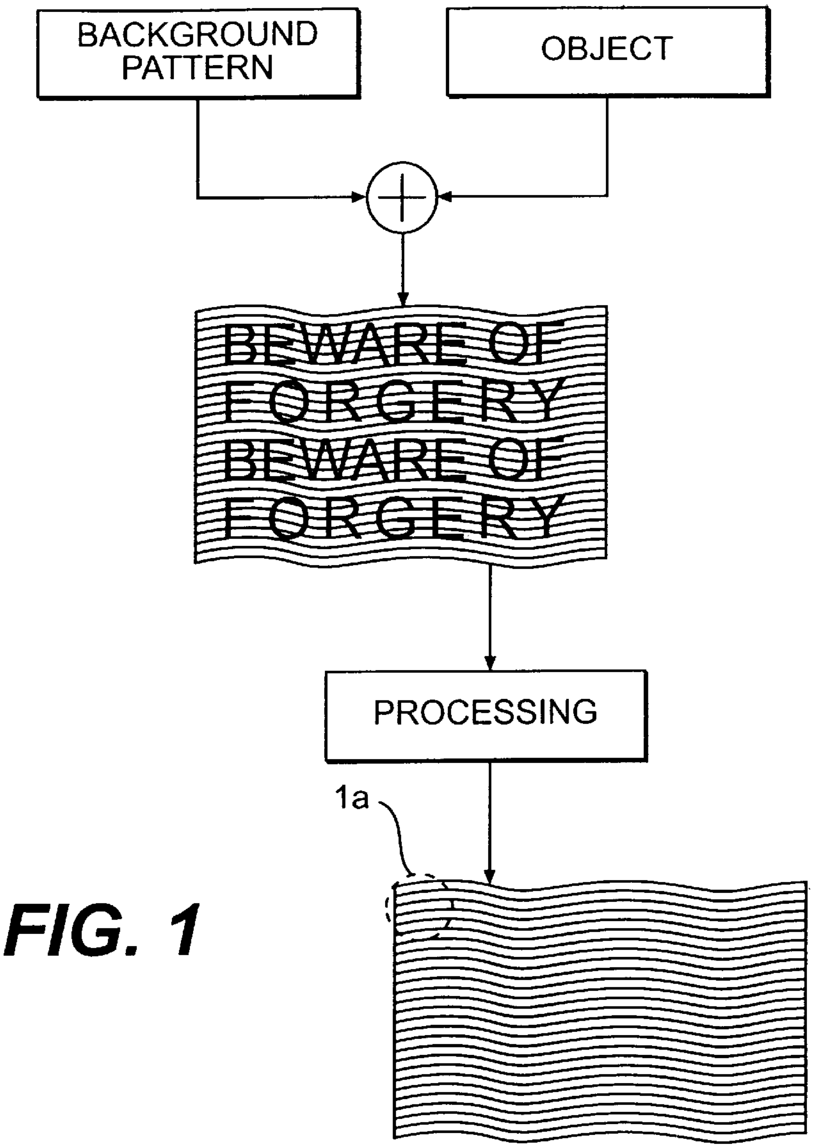
FIG. 1 shows the manner of producing a composition pattern for a security print according to the invention.
Figure 1A:
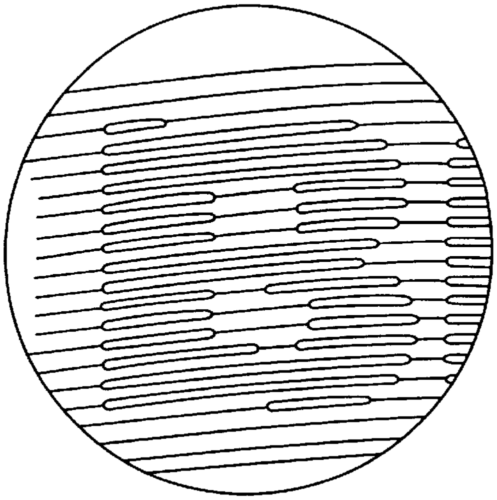
FIG. 1*a* depicts a finished security print the finished security print at the bottom.

As shown in FIG. 1, for preparing the print information one first supplies the desired background pattern information and furthermore prepares the information about the object to be worked into the background pattern. In the present case the "object" is a text, namely the text "BEWARE OF FORGERY" repeated several times. The combination of the information about the background pattern print and the object "BEWARE OF FORGERY" is shown clearly in FIG. 1. However, the text "BEWARE OF FORGERY" does not actually appear as such in the print. Rather, the text "BEWARE OF FORGERY" is worked into the background pattern consisting of slightly wavy lines in the way explained below so that the text is virtually unrecognizable with the naked eye.

This is shown at the bottom of FIG. 1. As one can see, the "combination" of background pattern and object contains no information immediately recognizable to the naked eye.

In FIG. 1*a* one sees a greatly enlarged detail of the security print. In this detail one can recognize the letter "B" upon closer inspection. The information of the letter "B" is formed by the lines of the linear background pattern being split into two thin partial lines at the relevant places of the object "B" to form hollowed regions. The partial lines each have a width corresponding to 40% of the original line width, the hollowed regions between the paired partial lines each having a with corresponding to 50% of the original line width (although for the purposes of clarity of illustration, the hollowed regions depicted in FIG. 1*a* have widths much greater than 50% of the original line width). When the letter "B" FIG. 1*a* is viewed from a distance of a few meters the "B" can virtually no longer be recognized as such, just as no information can be recognized in the security print in its original size at the bottom of FIG. 1.

When the security print shown at the bottom of FIG. 1 is copied on a commercial copying machine the lines of the original background pattern appear on the copy, these lines thereby forming hollowed regions having a width of 100 microns here, but the areas where the background pattern components are split into paired partial lines appear white or at least much lighter than the rest of the background pattern. This can be seen in FIG. 1, where (in another embodiment to be described below) the word "FORGERY" and the letter "F" are clearly visible while these "objects" cannot be recognized in the original security print.

In the example shown in FIG. 1, the text "BEWARE OF FORGERY" is the object to be worked into the background pattern which does not appear clearly in the original security print but in a copy made thereof. One can naturally also regard the background not occupied by the text "BEWARE OF FORGERY" as the "object", so that only this background appearing gray in the middle of FIG. 1 is executed with split lines while the areas where the "object" is located are executed with solid lines. In a copy the background will then naturally appear light and "BEWARE OF FORGERY" will appear in the original gray level of the background pattern.

The embodiment explained with reference to FIG. 1 performs its function not only with black-and-white copiers but also with color copiers.

FIGS. 2*a* to 2*d* show a second embodiment of the invention. The background pattern is a dot screen of small solid circles. The object "T" is shown overlapping with the background pattern in FIG. 2*a*.

Figure 2A:
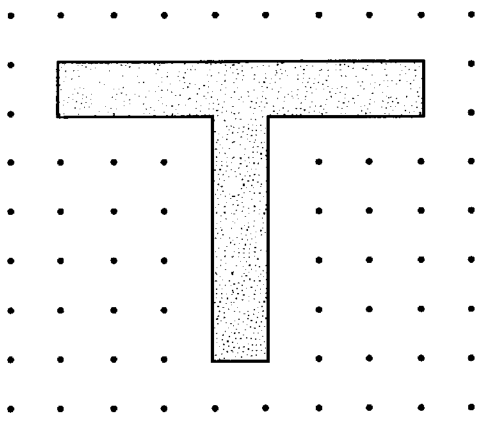
FIGS. 2*a* to 2*d* show details, partly on different scales, of a security print whose background pattern is formed by a dot screen.
Figure 2B:
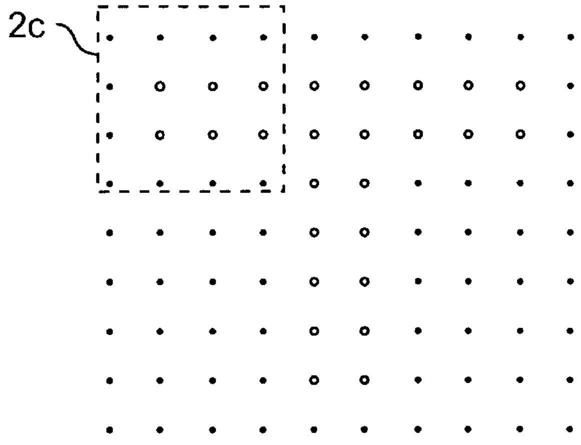

FIG. 2*b* shows the object "T" worked into the background pattern in the form of small rings, i.e. circles that each include a circular hollowed region, each replacing a solid circle of the background pattern.

Figure 2C:
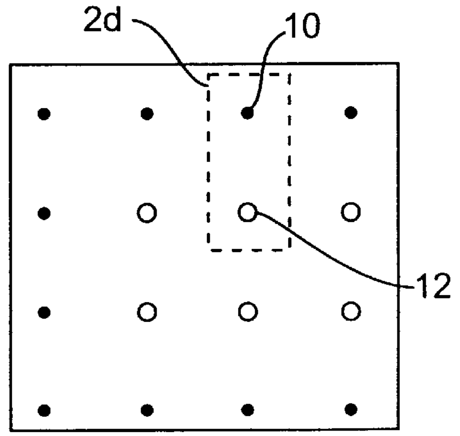

FIG. 2*c* shows an enlarged detail of FIG. 2*b*. FIG. 2*c* shows two upper rows and a left column of solid circles. The four elements on the bottom right in FIG. 2*c* are parts of the object worked into the background pattern.

Figure 2D:
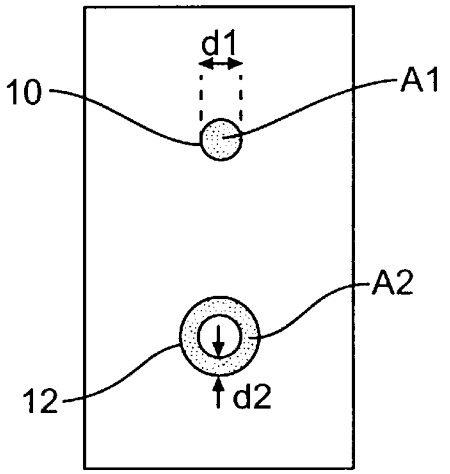

FIG. 2*d* shows an enlarged detail of FIG. 2*c*. At the top FIG. 2*d* shows solid circle 10 from FIG. 2*c*, and at the bottom ring 12 from FIG. 2*c*, this ring being formed by "splitting" the solid circle to form a circular hollowed region.

Diameter d1 of solid circle 10 is about twice as great as the thickness, that is to say the difference between outside radius and inside radius of ring 12 (d1≈2·d2).

Area A1 of solid circle 10 corresponds approximately to area A2, the area of the circular hollowed region of ring 12.

FIG. 3 shows a part of line L and a pair of partial lines TL according to the detail in FIG. 1*a*. The original line width is w1. Where the line is split into a pair of partial lines TL the outer edges of the pair of partial lines are shifted somewhat outward. Each partial line has width w2, the clear distance between the parallel partial lines being w3, the width of the hollowed region between the partial lines. It has proven expedient for the two partial lines to have the same width w2 and for the value of w2 to correspond approximately to 40 to 45% of original line width w1.

FIG. 4 shows representations of some alternative background patterns.

FIG. 4*a* schematically shows once again the embodiment of FIG. 3 wherein a line is split into two parallel partial lines having a hollowed region between them.

FIG. 4*b* shows the embodiment according to FIG. 2 wherein a solid circle is split into a ring, i.e. a circle having a circular hollowed region. The ring has approximately equal area to the solid circle.

FIG. 4*c* shows a further embodiment wherein the background pattern is formed by a screen of solid squares. At the places of an object to be worked in, the solid square is replaced by an angular ring or square frame having square hollowed region. The area of the frame corresponds approximately to that of the solid square.

FIG. 4*d* shows a rhombic background pattern component which is split into a hollow rhombus, i.e. a rhombus having rhomboid hollow region, at the places of an object, the dimensions again being selected so that the areas of the original background pattern component and the split background pattern component are approximately equal. The "line width" of the split elements shown in FIGS. 4*b*, 4*c* and 4*d* corresponds to about half the diameter or the width/length of the original element.

FIG. 4*e* shows a further embodiment of the invention. Here the original line pattern is split into, not two, but three parallel partial lines surrounding two adjacent hollow regions. Other background patterns with suitable splits are also conceivable.

Figure 5:
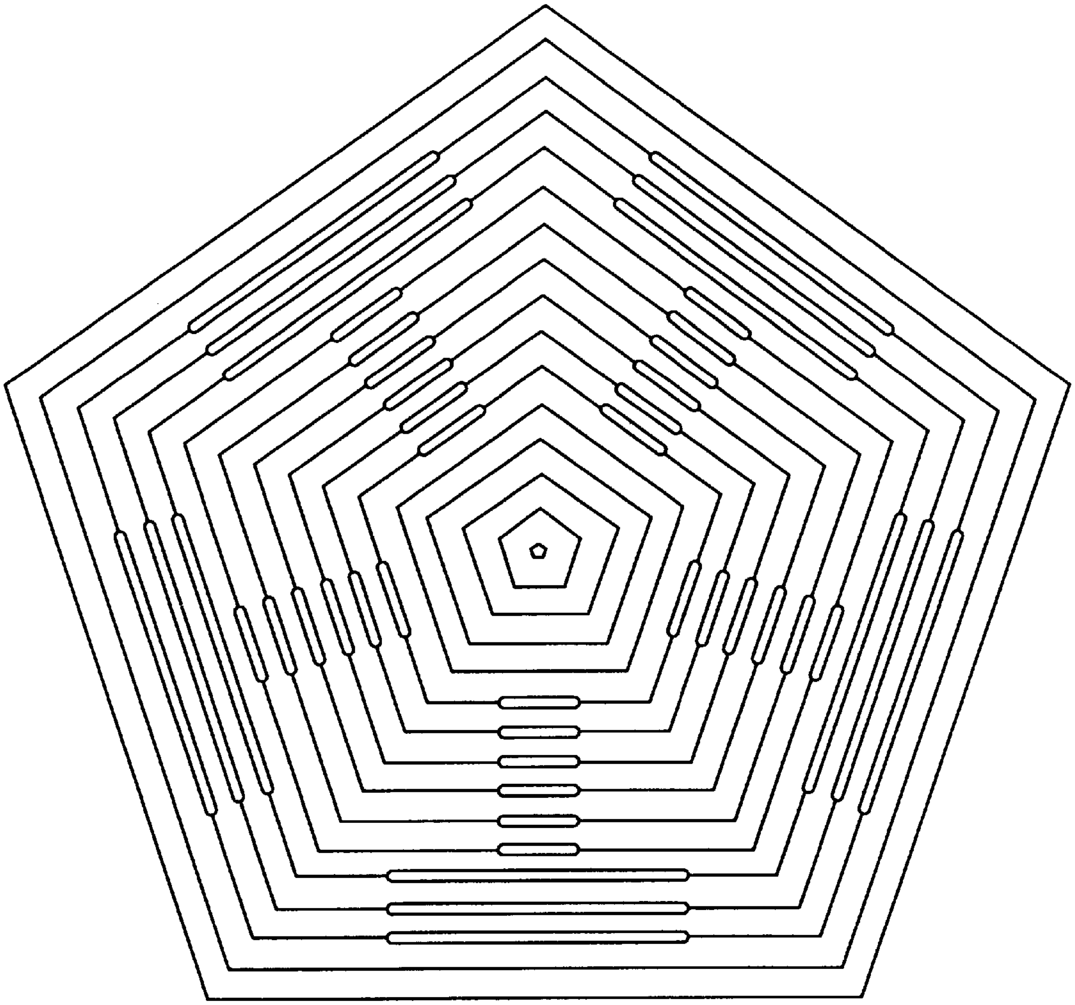
FIG. 5 shows a security print with a linear background pattern in various orientations.

As explained above, the objects worked into the background pattern are virtually unrecognizable with the naked eye; they appear only in the copy made of the original security print. The clarity with which the object appears in the copy depends on, among other things, the quality of the copying machine and the orientation of the background pattern with respect to the light scanning direction in the copying machine. To make the security print independent of such influences one disposes it in different orientations if it has a linear background pattern. FIG. 5 shows a security print with a linear background pattern, the background pattern being subdivided into five segments. In each segment the principal direction or orientation of the background pattern lines extends in a different direction. Altogether the background pattern lines are shifted 72° from sector to sector. At the top of FIG. 5 one can see the letter "F" and the word "FORGERY" which appears with different clarity in the various five sectors. Depending on how the original security print is oriented on the document glass plate of the copying machine, the individual objects appear with different clarity in the various sectors.

What is claimed is:

1. A copy-protected security print wherein at least one object is worked into a background pattern by components of said background pattern being hollowed at the places occupied by said object to form hollowed regions, wherein said object is not immediately recognizable by the naked eye.

2. The security print of claim 1, characterized in that said background pattern components have a width of no more than 150 microns.

3. The security print of claim 1 wherein said background pattern comprises lines and each of said hollowed regions are bordered by two or more partial lines at the places occupied by said object, each of said partial lines being formed by splitting one of said lines.

4. The security print of claim 3, characterized in that said two partial lines each have half the line width (w1) of said original line.

5. The security print of claim 3, characterized in that said partial lines each have 40 to 50% of said original line width (w1).

6. The security print of claim 3, wherein said partial lines comprise paired partial lines and the distance between said paired partial lines is between one third and two thirds of said original line width (w1).

7. The security print of claim 1 with a dot pattern of solid circles as said background pattern, characterized in that at places occupied by said object said solid circles are formed as rings whose area (A2) corresponds to 50% to 150% of the area (A1) of at least one of said solid circles.

8. The security print of claim 7, characterized in that the thickness (d2) of said ring corresponds to about half the diameter (d1) of at least one of said solid circles.

9. The security print of claim 1, characterized in that said background pattern contains families of lines whose orientation is varied between 0 and 360°.

10. The security print of claim 1, characterized in that said background pattern components have a width of no more than 100 microns.

11. The security print of claim 1 with a dot pattern of solid circles as said background pattern, characterized in that at places occupied by said object said solid circles are formed as rings whose area (A2) corresponds to 85 to 115% of the area (A1) of at least one of said solid circles.

12. The security print of claim 1, wherein at least two of said hollowed regions are adjacent to each other and are formed by splitting at least one of said lines into three partial lines.

13. A method for producing a security print wherein at least one object is worked into a substantially regular background pattern characterized by the following steps:

a) supplying print information for the background pattern;

b) supplying positional information for the object to be worked in;

c) supplying positional information which is capable of replacing the print information for the background pattern in certain places, and replaces the continuous component of the background pattern by split components of the background pattern by split components; and d) combining information a), b), and c) in such a way that the print information for the background pattern is replaced by the modified print information at the places where the object is located and wherein said object is not immediately recognizable by the naked eye.

* * * * *